United States Patent [19]

Tholen et al.

[11] 4,380,971
[45] Apr. 26, 1983

[54] INTERNAL COMBUSTION ENGINE HAVING A RETARDER

[75] Inventors: Paul Tholen, Bergisch Gladbach; Leo Lichtblau, Cologne; Friedemann Albers, St. Augustin; Dieter Esche, Cologne, all of Fed. Rep. of Germany

[73] Assignee: Klöckner-Humboldt-Deutz Aktiengesellschaft, Cologne, Fed. Rep. of Germany

[21] Appl. No.: 290,014

[22] Filed: Aug. 4, 1981

[30] Foreign Application Priority Data

Aug. 16, 1980 [DE] Fed. Rep. of Germany ....... 3031059

[51] Int. Cl.³ .............................................. F01P 1/06
[52] U.S. Cl. .................................. 123/41.31; 60/614; 123/323; 188/273
[58] Field of Search ................. 123/323, 41.31, 41.33, 123/41.49, 41.57; 188/273; 60/602, 605, 597, 60/614

[56] References Cited

U.S. PATENT DOCUMENTS 2,529,984 11/1950 Wiederkehr et al. ........ 123/41.33 X
3,303,348 2/1967 Cox et al. .......................... 60/602 X
4,273,082 6/1981 Tholen ............................. 123/41.31

Primary Examiner—William A. Cuchlinski, Jr.
Attorney, Agent, or Firm—Becker & Becker, Inc.

[57] ABSTRACT

An internal combustion engine having a retarder and a heat exchanger which re-cools the retarder oil, with cooling air being supplied to the heat exchanger during the braking operation. The internal combustion engine is provided with an exhaust conduit in which is arranged a blocking device for closing off the exhaust conduit during the braking operation, with the thus retained gas flow being utilized for conveying the cooling-air flow to the retarder oil heat exchanger.

8 Claims, 5 Drawing Figures

INTERNAL COMBUSTION ENGINE HAVING A RETARDER

The present invention relates to an internal combustion engine having a retarder and a heat exchanger which re-cools the retarder oil, with cooling air being supplied to the heat exchanger during the braking operation.

German Pat. No. 12 30 615 discloses an air-cooled internal combustion engine with a retarder oil heat exchanger, which receives cooling air only during the braking operation, whereas in normal engine operation the heat exchanger is closed by exhaust air valves.

The drawback of this apparatus consists in that by opening the exhaust air valves, the hood pressure drops, so that consequently the air throughput through the retarder oil heat exchanger is relatively small and the heat exchanger consequently must be made relatively large in order to remove the heat which is produced. However, the space needed for such a large heat exchanger is seldom available, especially not with present day limited space in motor vehicles.

These problems are especially intensified when more highly supercharged internal combustion engines are used in vehicles, with the proportion of engine friction and the braking capacity by means of the engine braking still only amounting to a fraction of the prescribed braking capacity.

It is an object of the present invention to provide an internal combustion engine of the type mentioned with a cooling system effective for the retarder oil, with such cooling system also being capable of being installed in motor vehicles.

This object, and other objects and advantages of the present invention, will appear more clearly from the following specification in connection with the accompanying drawings, in which.

Figure 4:
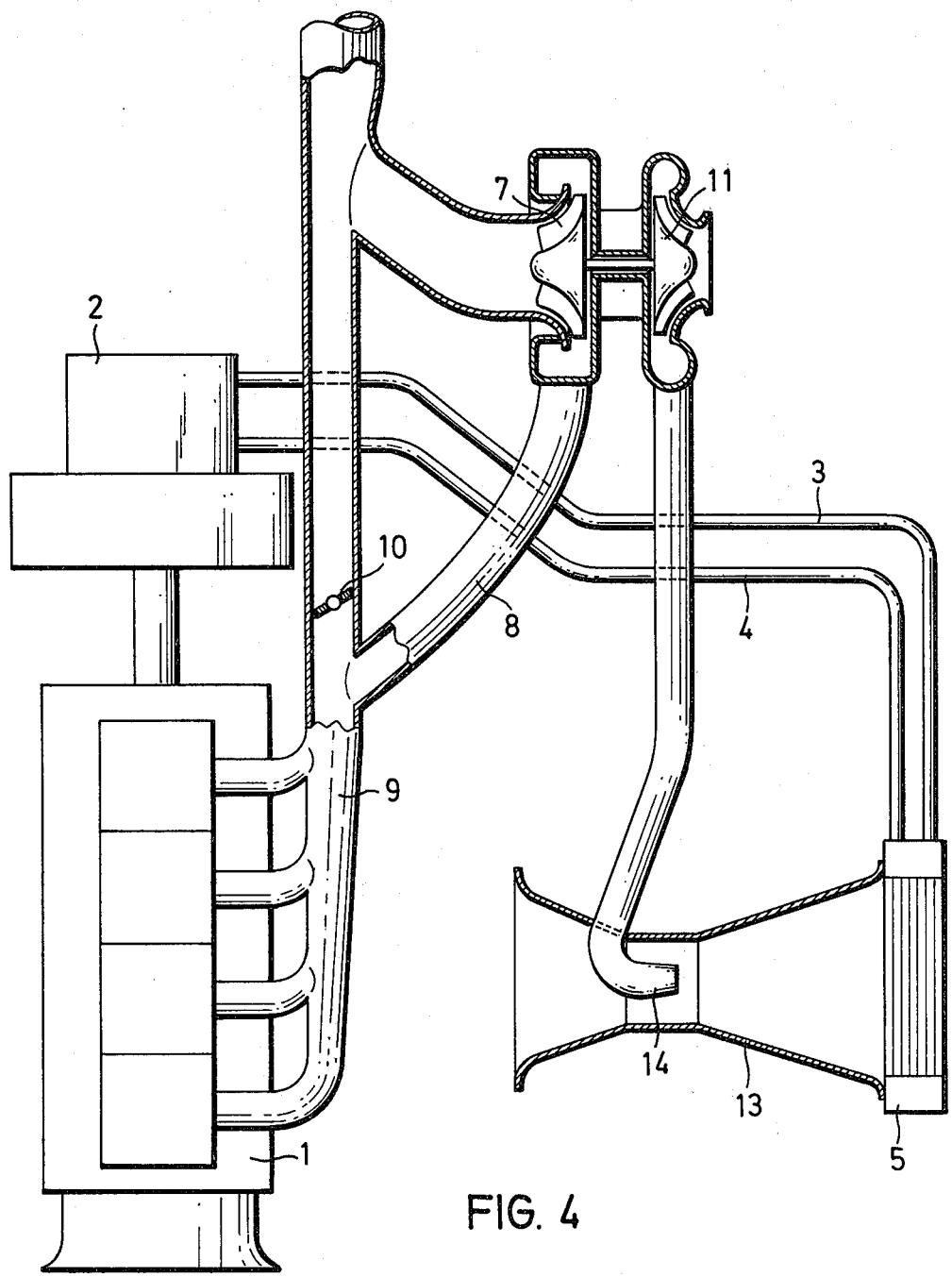
Figure 5:
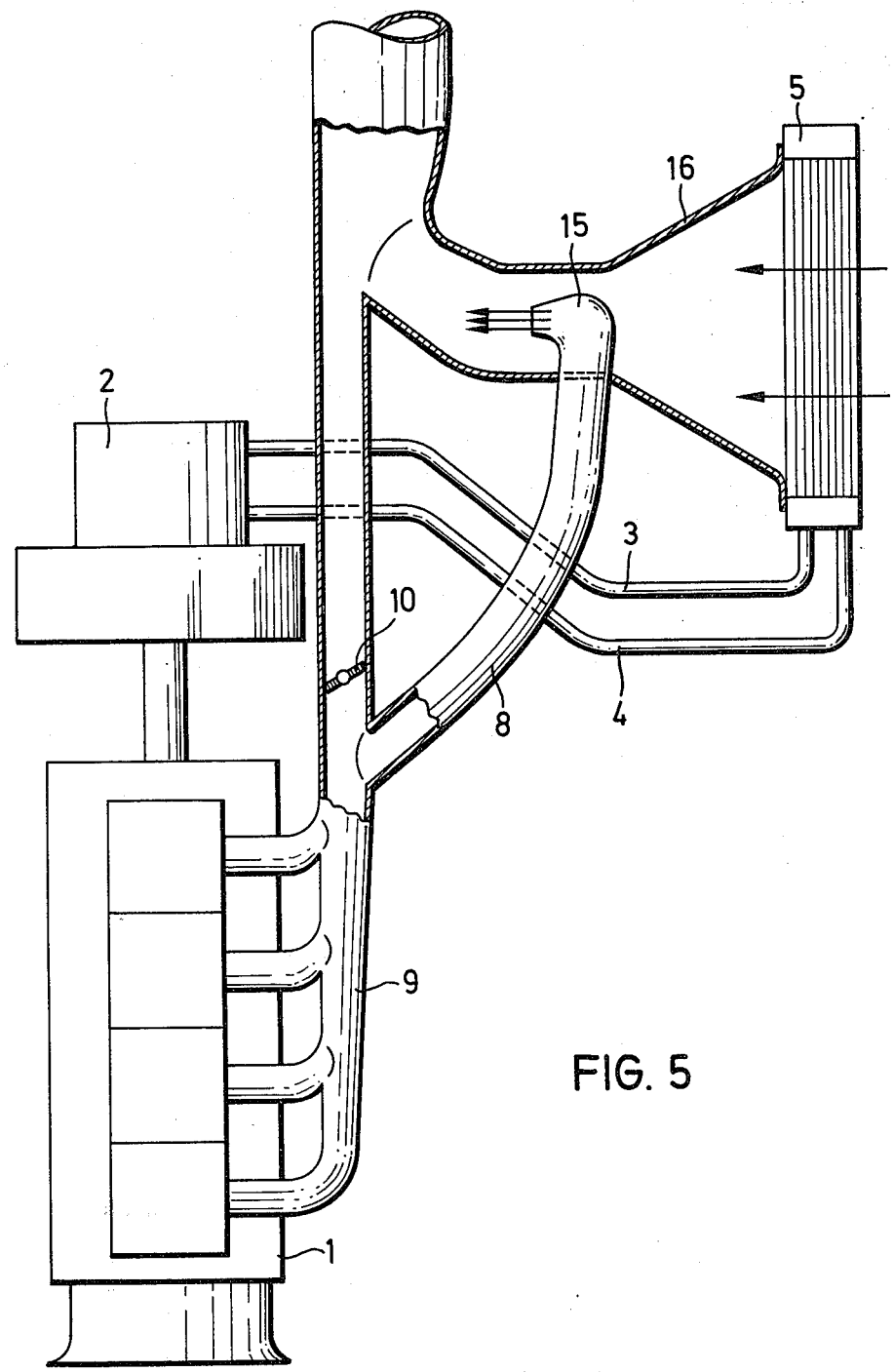

FIG. 4 shows an internal combustion engine with a retarder, and an exhaust-driven or turbo-supercharger in the secondary line of the exhaust gas conduit, and an ejector nozzle for generating the cooling air; and FIG. 5 shows an internal combustion engine with a retarder, and an ejector nozzle in the secondary line of the exhaust gas conduit, which nozzle is arranged in a cooling-air channel after the heat exchanger.

The arrangement of the present invention is characterized primarily by providing in the exhaust conduit of the internal combustion engine a blocking device for closing off the exhaust conduit during the braking operation, with the thus accumulated or retained gas flow being utilized for conveying the cooling-air flow to the retarder oil heat exchanger.

The present invention is based upon the realization that a sufficient cooling capacity for the retarder oil is only available when the corresponding heat exchanger is connected with a device independent of the engine cooling system to generate cooling air. Since the retarder heat exchanger is only utilized during the braking operation, it is further expedient during this operation, during which the internal combustion engine practically operates as a compressor, i.e. no combustion occurs in the cylinders, to create a cooling-air flow with this gas flow. Under these circumstances, the advantage is simultaneously attained that the braking capacity of the internal combustion engine is increased by this operation as a compressor.

One advantageous embodiment of the present invention provides for conveying the retained gas flow delivered from the internal combustion engine into a by-pass conduit of the exhaust conduit, and at this location arranging a device which utilizes the energy of the gas flow as driving energy. In particular, the by-pass conduit is associated with the blocking device of the exhaust conduit, with the device in the by-pass conduit converting the energy of the gas flow to generate a cooling-air flow. This device is preferably operated in a region of extremely disadvantageous efficiency, since in this way an increase of the counterpressure in the by-pass conduit arises, so that the internal combustion engine, which is operating practically as a compressor, must operate against an increased counterpressure, so that the braking capacity thereof is further increased.

Another embodiment of the present invention proposes embodying the device as a turbine which is connected directly or by means of an intermediate drive or gearing with a blower which then draws in the cooling air and conveys it on to the retarder oil heat exchanger. The turbine can be connected on the periphery of the cooling-air blower wheel or impeller (tip-fan), or can be connected by means of a shaft with a cooling-air blower.

According to another preferred embodiment of the present invention, the turbine is connected with a further compressor which draws in the by-pass air, compresses it, and conveys it to a cooling blower which has blades upon its impeller periphery; the by-pass flow delivered by the compressor hits the blades and consequently drives the cooling blower. The blades rotate in an annular chamber which is connected with the pressure outlet of the compressor.

This arrangement is especially advantageous when a direct engagement of the blower turbine leads to contamination or fouling thereof, and to high temperatures. Additionally, this embodiment makes possible an improved adaptation of the blower turbine to the exhaust flow which is available.

According to yet another embodiment, the pressure outlet of the compressor driven by the turbine is connected with an ejector nozzle which is arranged in the narrowest cross section of a cooling-air channel, whereby air is drawn in and can be conveyed through the retarder oil heat exchanger. In particular, when viewed in the direction of flow of the cooling air, the ejector is arranged ahead of the retarder oil heat exchanger in the cooling-air channel. The ejector nozzle can have a circular, an annular, or a rosette-shaped cross section, whereby with the latter a greater cooling-air quantity can be conveyed.

Another embodiment of the present invention provides for conveying the gas flow directly into an ejector nozzle, which is arranged in the narrowest cross section of a cooling-air channel; cooling air is drawn in through the retarder oil heat exchanger, which is connected ahead of the ejector nozzle. The ejector nozzle can be embodied as described in the preceding paragraph.

Especially with motor vehicles having installed therein internal combustion engines equipped with the apparatus or arrangement of the present invention, it is advantageous if the turbine, the compressor, the cooling-air blower, and the heat exchanger form a structural unit which is connected with the internal combustion engine only by means of the by-pass conduit of the exhaust conduit. As a result, except for the by-pass or secondary conduit associated with the exhaust conduit, and the retarder oil supply and discharge conduits in the retarder oil cooling system, one is independent of the internal combustion engine, so that this cooling system can be provided where the most space is available therefor. This is especially advantageous for internal combustion engines which are subsequently equipped with such a cooling system. This embodiment likewise offers advantages with respect to servicing and the possible replacement in case of repair.

Figure 1:
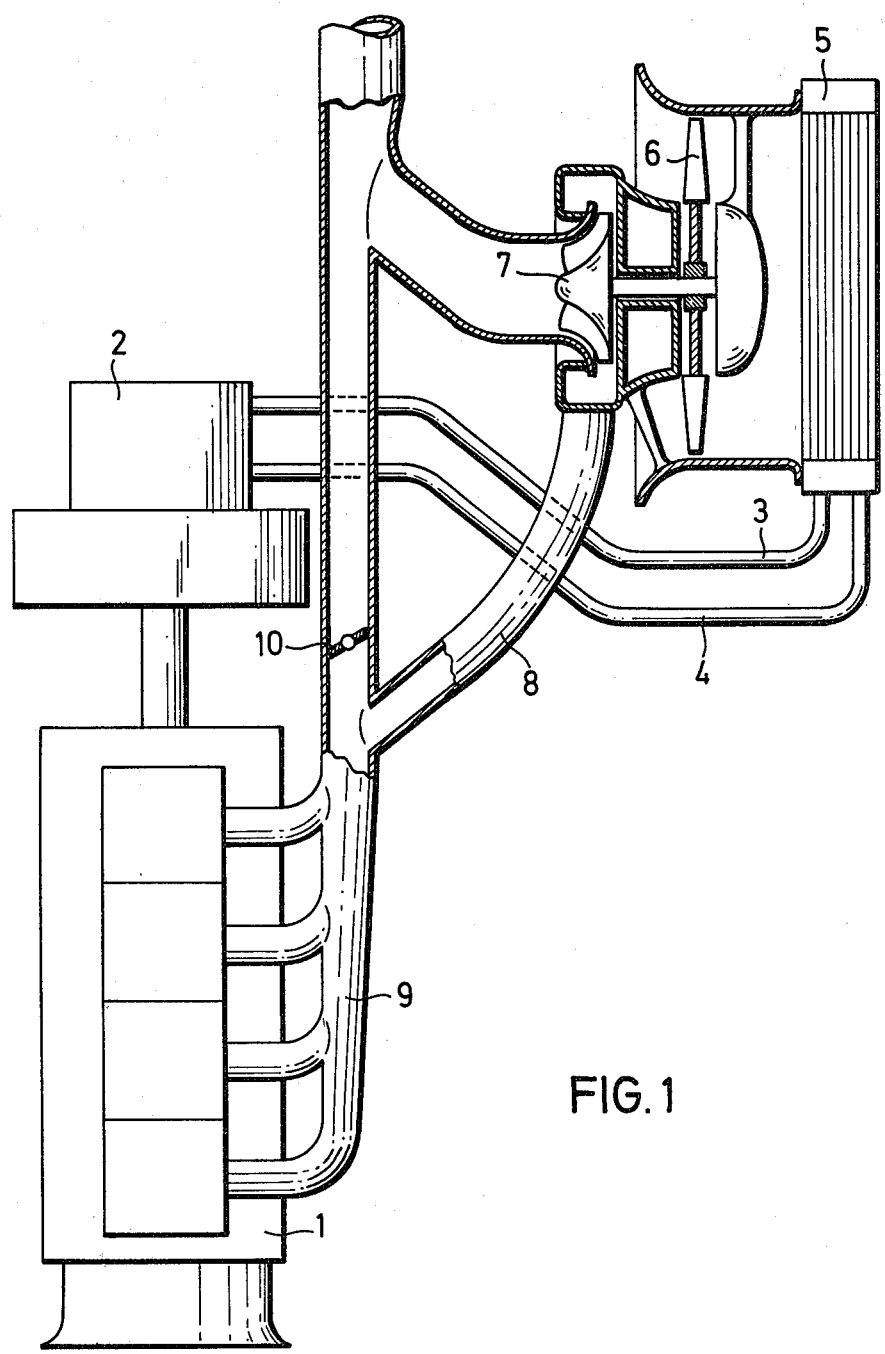
FIG. 1 shows an internal combustion engine with a retarder, and a cooling system in accordance with one embodiment of the present invention, whereby the cooling blower is connected directly with the turbine.

Referring now to the drawings in detail, FIG. 1 shows an air-cooled internal combustion engine 1 to which retarder 2 is connected. The teaching of the present invention is, however, not restricted to air-cooled internal combustion engines, but is also applicable to water-cooled internal combustion engines.

The retarder is connected by means of two conduits 3,4 with a retarder oil heat exchanger 5 in which the oil, considerably heated in the retarder operation, can be recooled. For this purpose, the retarder oil heat exchanger has a blower or fan 6 which is driven directly by a turbine 7. It is also conceivable to arrange an intermediate drive or gearing between the turbine 7 and the blower 6.

The turbine 7 is arranged in a secondary line or by-pass conduit 8 of the exhaust conduit 9 of the internal combustion engine. Furthermore, a blocking device 10 for closing the exhaust conduit 9 is arranged in the exhaust conduit after the branch-off of the by-pass conduit 8, when viewed in the direction of the flow of the exhaust gas. This blocking device 10 is preferably embodied as a commercially available exhaust air deflector which is switched on either manually or automatically simultaneously with switching on of the retarder.

If the internal combustion engine is in the braking operation, the oil circulating in the retarder 2 is heated. The oil is consequently conveyed to the heat exchanger 5 to be cooled. Since no combustion occurs in the internal combustion engine during the braking operation, the internal combustion engine operates practically as a compressor and consequently delivers no exhaust gas flow, but rather only a gas flow. The exhaust air deflector 10 is switched on at the same time as the retarder 2, so that the gas flow delivered during the braking operation from the internal combustion engine 1 is conveyed through the bypass conduit 8 to the turbine 7, and from there back again into the exhaust conduit 9. Consequently the turbine 7 is driven, whereby likewise the blower 6 rotates. The turbine 7 is advantageously embodied in such a way that it operates at a poor efficiency, so that the gas flow guided through the by-pass or secondary conduit 8 is retained and the internal combustion engine 1 must operate against a higher output pressure, so that the braking power thereof is additionally increased. By suitable opening or closing of the exhaust air deflector 10, the gas flowing through the turbine 7 can be regulated, and consequently the speed of the blower 6 can be changed. The control of the exhaust air deflector is advantageously dependent upon the retarder oil temperature. If the retarder 2 is again disconnected or switched off, the exhaust air deflector 10 is again opened, and the internal combustion engine 1 is fired so that it can again operate counter to the usual exhaust counterpressure. At the same time, the exhaust gas flowing through the by-pass conduit 8 is practically eliminated since the turbine 7 offers a greater resistance than does the exhaust conduit 9. Consequently, the blower 6 is also stopped, since no retarder oil has to be recooled in the heat exchanger 5 during normal engine operation.

Figure 2:
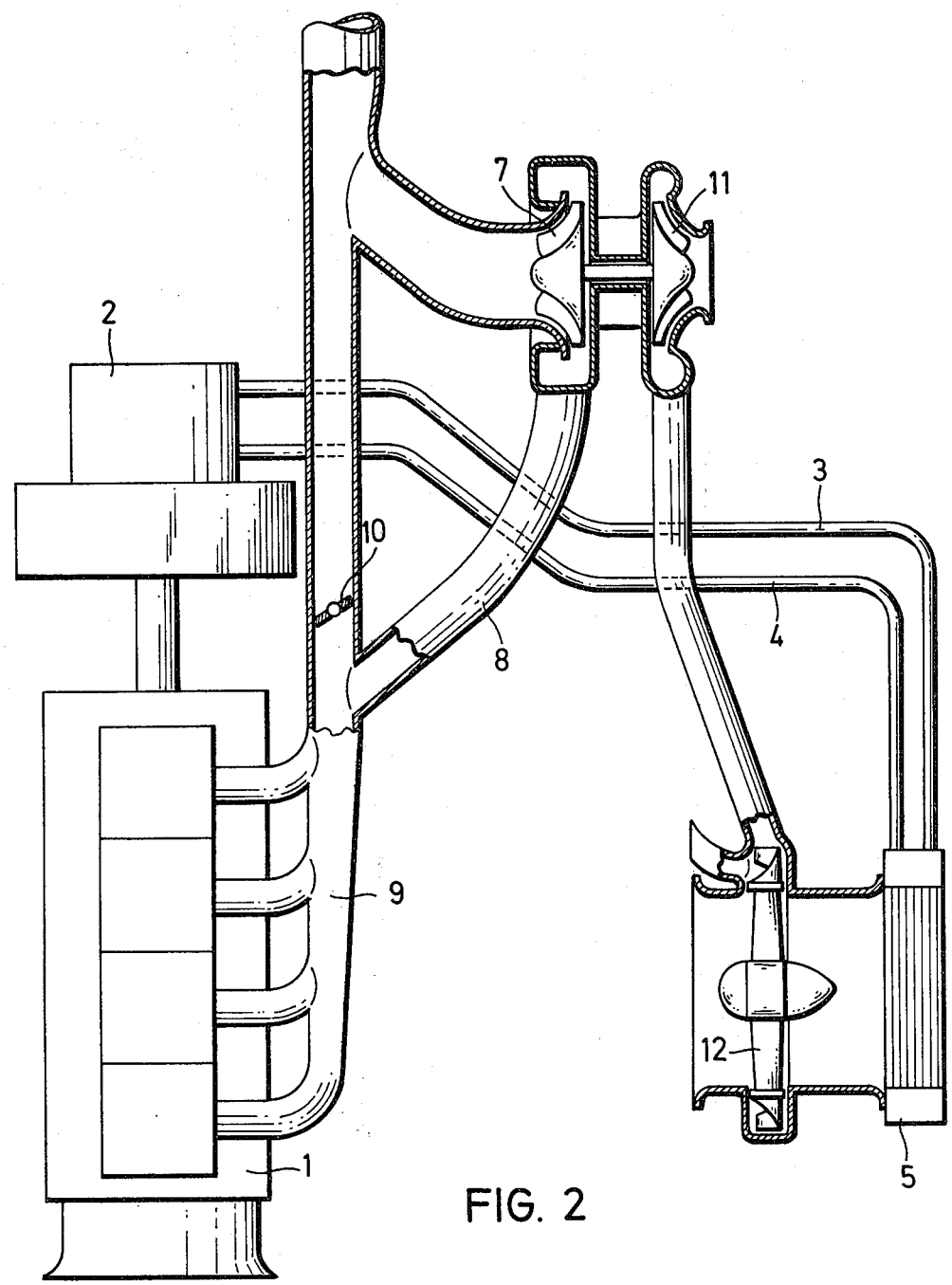
FIG. 2 shows an internal combustion engine with a retarder, and an exhaust-driven or turbo-supercharger in the secondary line of the exhaust conduit, the turbo-supercharger being equipped with a tip-fan for generating the cooling air.

The embodiment of FIG. 2 differs from that of FIG. 1 only in that the turbine 7 is not connected directly with the blower 6, but rather with a compressor 11. The turbine 7 and the compressor 11 form an exhaust-driven or turbo-supercharger, though with the difference that during the braking operation the gas which flows therethrough is not the exhaust gases of the internal combustion engine, but rather the gas flow (surrounding air) compressed by the internal combustion engine; the supercharger has a poor efficiency, so that an increased counterpressure is generated for the internal combustion engine.

The compressor 11 draws in surrounding air during operation, and conveys it to a tip-fan 12, i.e. to a blower impeller which has blades on its periphery which are acted upon by a gas flow in such a manner that the entire device rotates.

In contrast to FIG. 1, the cooling-air flow is drawn by the tip-fan 12 through the retarder oil heat exchanger. Otherwise, this system operates in the same manner as described for the system in FIG. 1.

Figure 3:
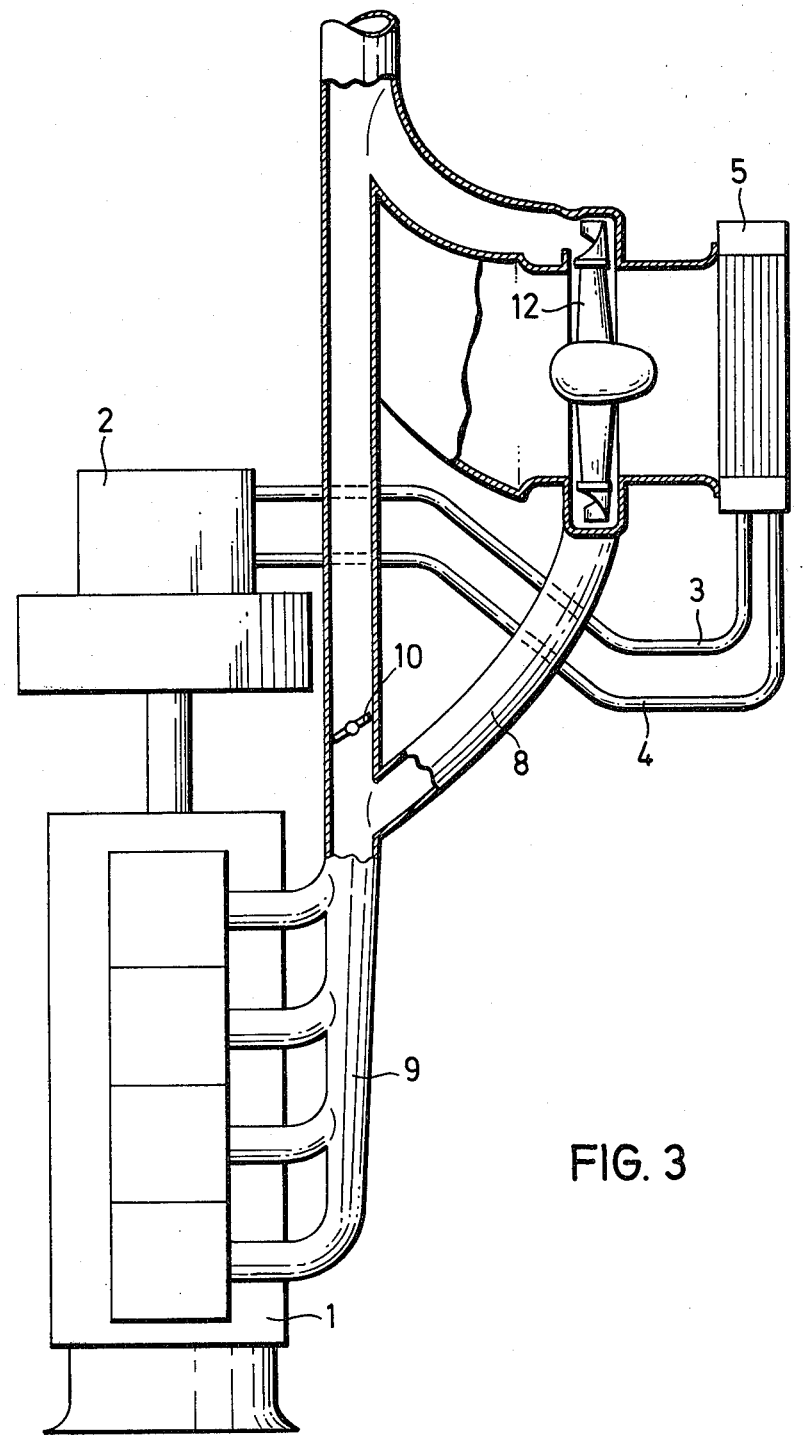
FIG. 3 shows an internal combustion engine with a retarder, and a tip-fan, for generating the cooling air, arranged in the secondary line of the exhaust conduit.

The embodiment of FIG. 3 differs from that of FIG. 2 in that no turbine 7 and no compressor 11 are provided; rather, the by-pass conduit 8 leads directly to the tip-fan 12.

In the embodiment of FIG. 4, no blower is provided for generating a cooling-air flow through the retarder oil heat exchanger; rather, a cooling-air channel 13, which tapers and then widens again, is arranged ahead of the retarder oil heat exchanger 5 when viewed in the flow direction of the cooling air. An ejector nozzle 14 opens into the narrowest cross section of the cooling air channel 13 and is connected with the pressure outlet of the compressor 11 of FIG. 2. A high underpressure is generated in the cooling-air channel 13 with this arrangement, so that surrounding air is drawn in and is conveyed at high speed toward and through the heat exchanger 5.

FIG. 5 differs from FIG. 4, in a manner similar to the difference between FIG. 3 relative to FIG. 2, in that the ejector nozzle 15 is connected directly with the by-pass conduit 8. Since the gas flow discharging at the ejector nozzle 15 cannot be permitted to mix with the cooling-air flowing through the cooling-air channel 16 because of its temperature and purity, the drawn-in cooling air first flows through the heat exchanger 5, mixes with the gas flow discharging from the ejector, and then passes with this gas flow into the exhaust conduit 9.

Depending upon the size of this return conduit, it may be expedient with all embodiments to close this return conduit during normal driving operation by means of a suitable device to preclude the exhaust gas from escaping therethrough.

The present invention is, of course, in no way restricted to the specific disclosure of the specification and drawings, but also encompasses any modifications within the scope of the appended claims.

What we claim is:

1. An arrangement for an internal combustion engine having an exhaust conduit, a retarder, and a heat exchanger connected to said retarder for re-cooling retarder oil, cooling air being supplied to said heat exchanger during a braking operation of said internal combustion engine, the improvement in combination therewith comprising a blocking device arranged in said exhaust conduit for at least partially closing off said exhaust conduit during a braking operation and thus retaining gas flowing from said internal combustion engine, said retained gas flow being utilized for effecting said supplying of cooling air to said heat exchanger, by-pass means provided as to said blocking device arranged in said exhaust conduit, and means for generating a cooling air flow being provided in said by-pass means, said means for generating a cooling air flow being driven by exhaust gas flowing through said by-pass means.

2. An arrangement in combination according to claim 1, which by-pass means includes a by-pass conduit associated with said blocking device for receiving said retained gas flow from said exhaust conduit, and which includes a device, arranged in said by-pass conduit, for converting the energy of said retained gas flow in order to generate a cooling-air flow to said heat exchanger.

3. An arrangement in combination according to claim 2, in which said device is a turbine, and which includes a blower for effecting said cooling-air flow to said heat exchanger, said turbine being operatively connected with said blower.

4. An arrangement in combination according to claim 3, which includes a compressor interposed between and in communication with said turbine and said blower, and in which said blower is provided with blades on its impeller periphery, said blades rotating in an annular chamber which is connected to the pressure side of said compressor.

5. An arrangement in combination according to claim 4, in which said turbine, said compressor, said blower, and said heat exchanger are a structural unit which is connected with said internal combustion engine merely by means of said by-pass conduit of said exhaust conduit.

6. An arrangement in combination according to claim 2, in which said device is a turbine, and which includes an ejector for effecting said cooling-air flow to said heat exchanger, said arrangement further including a cooling-air channel which is in communication with said heat exchanger, said cooling-air channel, when viewed in the direction of flow of said cooling air, being arranged ahead of said heat exchanger, said arrangement further including a compressor interposed between and in communication with said turbine and said ejector, said ejector being arranged in said cooling-air channel and being connected to the pressure side of said compressor.

7. An arrangement in combination according to claim 2, which includes a cooling-air channel which, when viewed in the direction of flow of said cooling air, is arranged after said heat exchanger, and in which said device arranged in said by-pass conduit is an ejector which is also arranged in said cooling-air channel.

8. An arrangement in combination according to claim 2, in which said device arranged in said by-pass conduit is a blower provided with blades on its impeller periphery.

* * * * *